(12) United States Patent
Russell

(10) Patent No.: US 6,755,109 B2
(45) Date of Patent: Jun. 29, 2004

(54) CABLE STRIPPER

(75) Inventor: Alan S. Russell, Tampa, FL (US)

(73) Assignee: Techmold Company, Tampa, FL (US)

( * ) Notice: Subject to any disclaimer, the term of this patent is extended or adjusted under 35 U.S.C. 154(b) by 66 days.

(21) Appl. No.: 10/238,165

(22) Filed: Sep. 10, 2002

(65) Prior Publication Data

US 2004/0045165 A1 Mar. 11, 2004

(51) Int. Cl.[7] .................................................. B21F 13/00
(52) U.S. Cl. ............................. 83/591; 83/947; 30/90.2
(58) Field of Search ................................. 30/90.2, 90.6, 30/90.1; 83/947, 591, 869; 81/9.44, 9.4

(56) References Cited

U.S. PATENT DOCUMENTS

| | | | |
|---|---|---|---|
| 843,353 A | 2/1907 | McKenna | |
| 2,346,227 A | 4/1944 | Martin et al. | |
| 3,623,384 A | 11/1971 | Murphy | |
| 3,665,603 A | 5/1972 | Bilbrey et al. | |
| 3,826,001 A | 7/1974 | Bilbrey et al. | |
| 4,059,893 A | * 11/1977 | Solury | ........................ 30/90.1 |
| 4,179,956 A | 12/1979 | Gooley | |
| 4,489,490 A | 12/1984 | Michaels et al. | |
| 4,955,137 A | 9/1990 | Matthews | |
| 5,077,895 A | 1/1992 | Okubo et al. | |
| 5,105,542 A | * 4/1992 | Nakajima et al. | ............ 30/90.1 |
| 5,487,220 A | 1/1996 | Saitu | |
| 6,044,744 A | 4/2000 | Eslambolchi et al. | |
| 6,131,289 A | * 10/2000 | Tarpill | ........................ 30/90.6 |
| 6,308,417 B1 | 10/2001 | Ducret | |
| 6,381,850 B1 | * 5/2002 | Warner | ........................ 30/90.6 |
| 6,510,610 B2 | * 1/2003 | Losinger | ..................... 30/90.2 |
| 6,513,244 B1 | * 2/2003 | Andreescu | ................... 30/90.2 |
| 6,637,101 B2 | * 10/2003 | Hathaway et al. | ............ 29/829 |
| 6,640,439 B2 | * 11/2003 | Losinger | ..................... 30/90.2 |

OTHER PUBLICATIONS http://www.lemco-tool.com/wireless.html.

* cited by examiner

Primary Examiner—Kenneth E. Peterson
(74) Attorney, Agent, or Firm—David W. Pettis, Jr., P.A.

(57) ABSTRACT

A cable stripper of the type typically used by an operator to remove the outer insulation layer from a coaxial cable having a ridged outer conductor such as that typically used in the telecommunications industry. The cable stripper includes unique stop devices that actually engage the stripped outer conductor so as to prevent removal of more than a predetermined length of the outer insulation and so as to present the distal end of the stripped cable for trimming so that the cable is properly prepared for use and installation.

6 Claims, 5 Drawing Sheets

CABLE STRIPPER

BACKGROUND OF THE INVENTION

1. Field of the Invention

The present invention relates to a cable stripper of the type used to remove the outer insulation layer of a coaxial cable such as that typically used in the telecommunications industry, and for trimming the stripped distal end of the cable, thereby preparing the stripped cabled for use. The cable stripper of this invention is particularly characterized by its construction including at least one cable stop operatively mounted on the stripper for positively engaging the outer conductor, once the insulation has been removed, so as to provide a stripped cabled segment of predetermined length such that connectors and/or splices applied to the stripped cable distal end will fit properly to ensure proper functionality of the cable.

2. Description of the Prior Art

In the telecommunications industry, relatively large diameter coaxial cables are typically used for transmitting signals from antenna towers to switching equipment. These cables have an outer insulation layer, an outer conductor that is typically formed from copper and has a ridged surface, a layer of foam-type insulation, and an inner conductor, also typically formed from copper. In order to make connections to the cable, it is necessary to remove the outer insulation, and to trim the stripped distal end of the cable. This stripping and trimming operation is critical in at least three regards. First, depending upon the connection being made, a very precise segment of the outer insulation must be removed so as to provide an exposed outer conductor at the cable's distal end having a predetermined longitudinal dimension. Second, the exposed surface of the outer conductor must not be scratched, bent, nor otherwise marred, for this could result in an improper, non-functional connection being made. Third, the distal end of the stripped cable must be trimmed so that it defines a plane that is substantially normal with respect to the axis of the cable to ensure proper, functional attachment of connecting devices.

While a wide variety of cable stripping devices are known in the prior art, the majority of such prior art devices are constructed merely to remove an outer insulation layer from a conductor. This is true with regard to single conductors and coaxial conductors. Such prior art devices sometimes remove the outer insulation layer by making a longitudinal slit, and others dispose a blade tangentially to remove the outer insulation in a spiral as the cutting device is rotated about the conductor. In most prior art devices, if the distal end of the stripped conductor is to be trimmed, it is frequently necessary to reposition either the cutting device or the stripped cable before trimming the distal end.

In light of the development of relatively large diameter coaxial cables such as those used in the telecommunications industry and generally described above, cable stripping devices for removing the outer insulation layer and for trimming the stripped distal end have been developed. Such devices basically take the form of a cylinder having a passageway through the axis for insertion of the cable to be stripped. In such prior art devices, the cable first encounters a tangential blade that will remove the outer insulation layer as the device is rotated around the cable. The outer insulation is removed as a spiral, and the stripped cable end advances into the stripper. When sufficient outer insulation has been removed the stripped distal end will encounter a second cutting blade that is disposed to trim the stripped distal end to define a plane that is substantially normal to the longitudinal axis of the stripped cable. However, if the operator of the cable stripper continues to rotate the device, more and more outer insulation will be removed, and a corresponding excess of stripped distal end will also be removed. Obviously, this can, over time, result in significant waste of relatively expensive coaxial cable.

The above problem is a result of the fact that prior art devices simply do not provide suitable means for stopping the advancement of cable into the stripper once a predetermined length of the outer insulation layer has been removed. Obviously, the length of exposed outer conductor is predetermined by the distance between the first cutting blade and the second cutting blade. However, there simply is no effective means for stopping the cable stripper once the predetermined segment of outer insulation has been removed.

It is therefore apparent that there remains a great need in the art for a cable stripper suitable for use in combination with coaxial cables for removing the outer insulation and for trimming the stripped distal end, and for positively stopping the stripping action once a predetermined segment of outer conductor has been has been exposed. In addition, any such means for stopping further advancement of the cable once the predetermined segment has been exposed must not damage the outer conductor, or subsequent failure of the cable for its intended purpose could occur.

SUMMARY OF THE INVENTION

The present invention relates to a cable stripper for removing the external or outer layer of insulation on a coaxial cable having a ridged outer conductor and an inner conductor, the two conductors being separated by insulation. The cable stripper further includes means for trimming the stripped cable end to define a plane that is substantially normal to the longitudinal dimension of the stripped cable. The cable stripper of this invention is preferably a substantially cylindrical housing having a central bore for receiving the cable to be stripped. This bore or passageway is dimensioned and configured to receive the cable and a first blade is mounted on the housing in operative communication with the passageway whereby the first blade will remove the outer layer of insulation from the cable as either the stripper is rotated, or the cable is rotated. As stripped cable advances into the passageway, the stripped distal end engages a cable shoulder formed on at least one cable stop that is pivotally attached to the housing, causing the cable stop to pivot outwardly.

Disposed at the bottom of this cable stop is a lock tip that necessarily pivots inwardly, toward the stripped cable. Mounted below the cable stop is a retaining member that is biased into engagement with the bottom of its corresponding cable stop. This bearing surface defines a first planer segment that abuts a corresponding stop member bottom surface, and the bearing surface then defines a second angled surface that will engage the backside of its corresponding cable stop when it has pivoted sufficiently to clear the first planer segment. Because the retaining member is normally biased toward its corresponding cable stop bottom surface, as the stop pivots beyond the retaining member first planer segment onto the second angled surface, the biasing action will effectively lock the lock tip into a corresponding groove of the ridged outer conductor. This positively prevents further advancement of the cable into the stripper, resulting in a stripped distal end having a longitudinal dimension defined by the predetermined distance between the first and second blades of the stripper and prevents waste of the conductor. Depending upon the size (diameter) of the cable, a plurality of cable stops and, thus, a corresponding plurality of retaining members may be utilized for preventing further advancement of the cable.

The invention accordingly comprises the features of construction, combination of elements, and arrangement of parts which will be exemplified in the preferred construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DETAILED DESCRIPTION OF THE INVENTION

Figure 5:
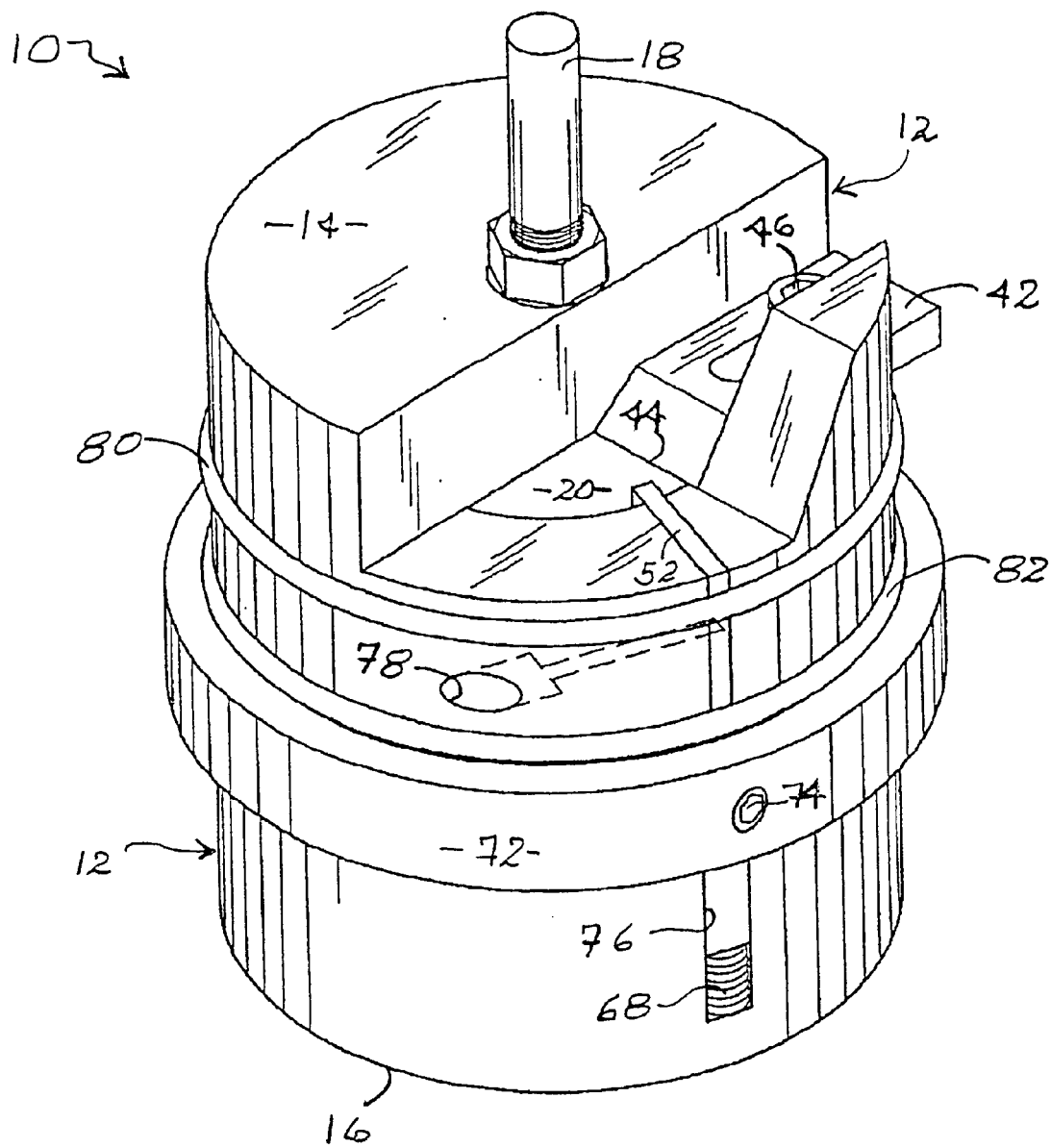
FIG. 5 is a perspective view of the Stripper shown in FIG. 1.

The cable stripper of this invention is generally indicated as 10 in each of the drawing figures, and generally illustrated in the perspective view of FIG. 5. Referring to the view of FIG. 5, it can be seen that the preferred embodiment for stripper 10 comprises a generally cylindrical housing, generally indicated as 12, and having a top end 14 and a bottom end 16. A handle, or shaft, 18 is attached to housing 12 and extends upwardly from top end 14. Gripping and turning handle 18 will cause the entire stripper 10 to rotate. It is also to be understood that handle 18 could be engaged by a power tool, or could be modified to include a T-bar such that stripper 10 could be turned manually. Formed along the central axis of housing 12 is a passageway 20, the partially open top end of which is seen in the view of FIG. 5.

Figure 6:
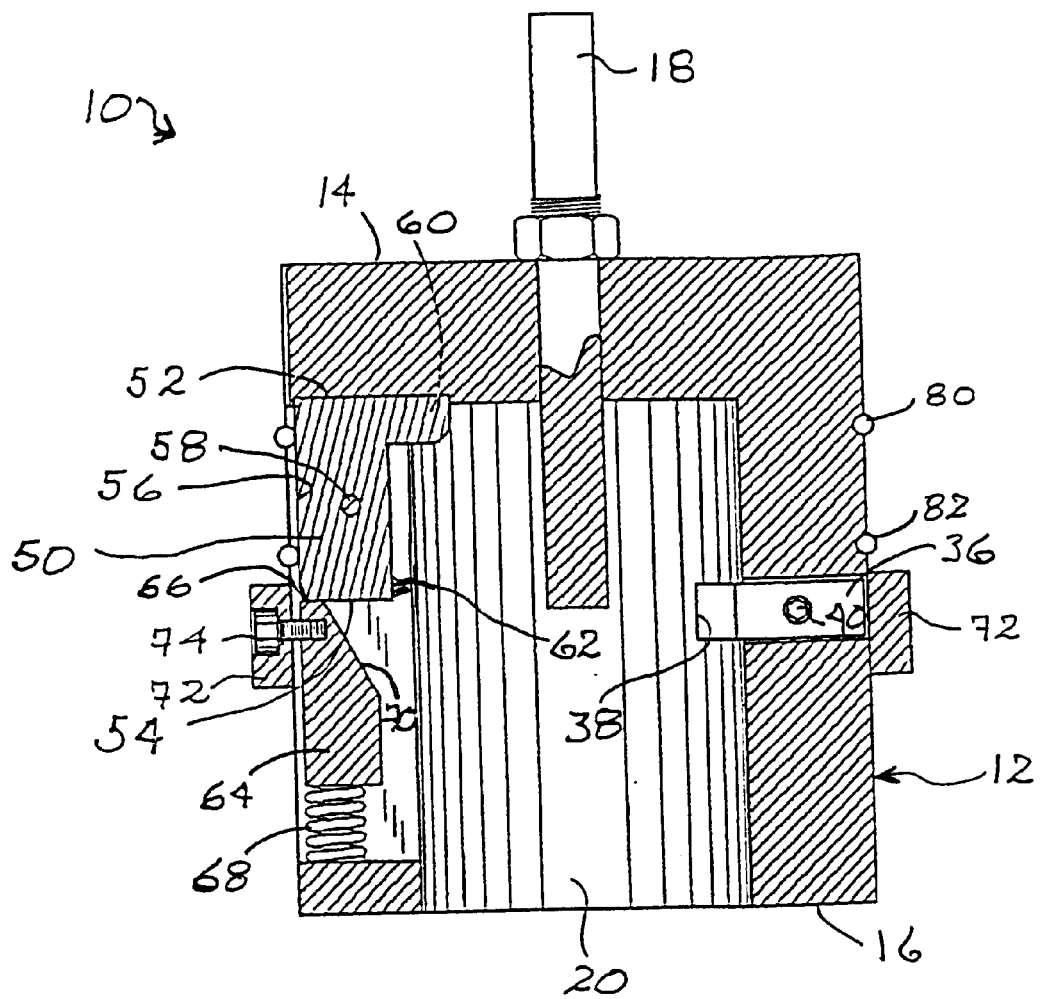
FIG. 6 is a sectional view taken along line 6—6 of FIG. 1.
Figure 7:
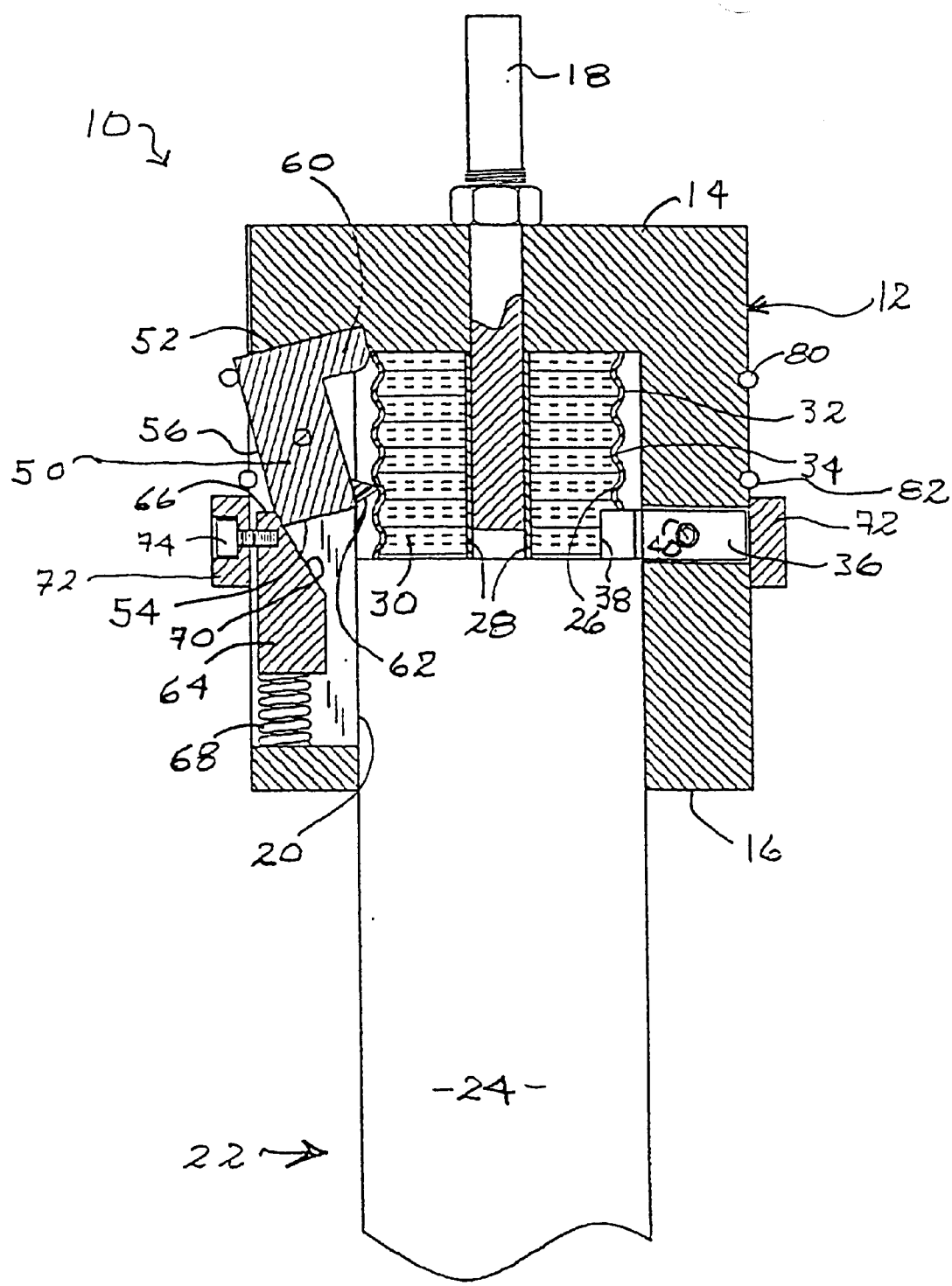
FIG. 7 is a sectional view similar to that of FIG. 6 with a stripped cable inserted.

Turning to the sectional views of FIGS. 6 and 7, one can see that passageway 20 is dimensioned and configured for reception of the cable, generally indicated as 22 in the view of FIG. 7. Cable 22 is of the type typically used in the communications industry and includes an external layer of insulation 24, a ridged outer conductor 26, an inner conductor 28, and insulation 30 disposed between outer conductor 26 and inner conductor 28. External insulation 24 is typically a plastic material, outer conductor 26 and inner conductor 28 are typically copper, and insulation 30 is typically a foam-type material, such as, for example, styrofoam. As seen in the sectional view of FIG. 7, the ridged configuration of outer conductor 26 provides a plurality of lands 32 and grooves 34 once external insulation 24 has been removed.

Figure 3:
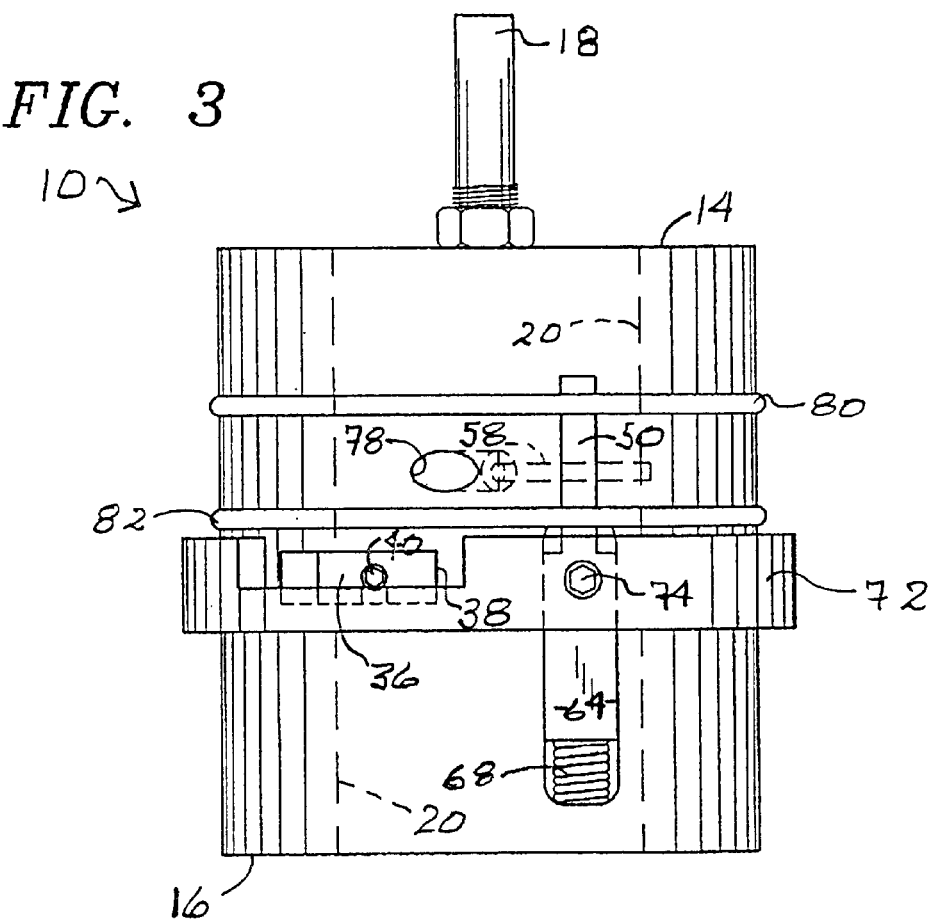
FIG. 3 is a left side elevation of the stripper shown in FIG. 1.
Figure 4:
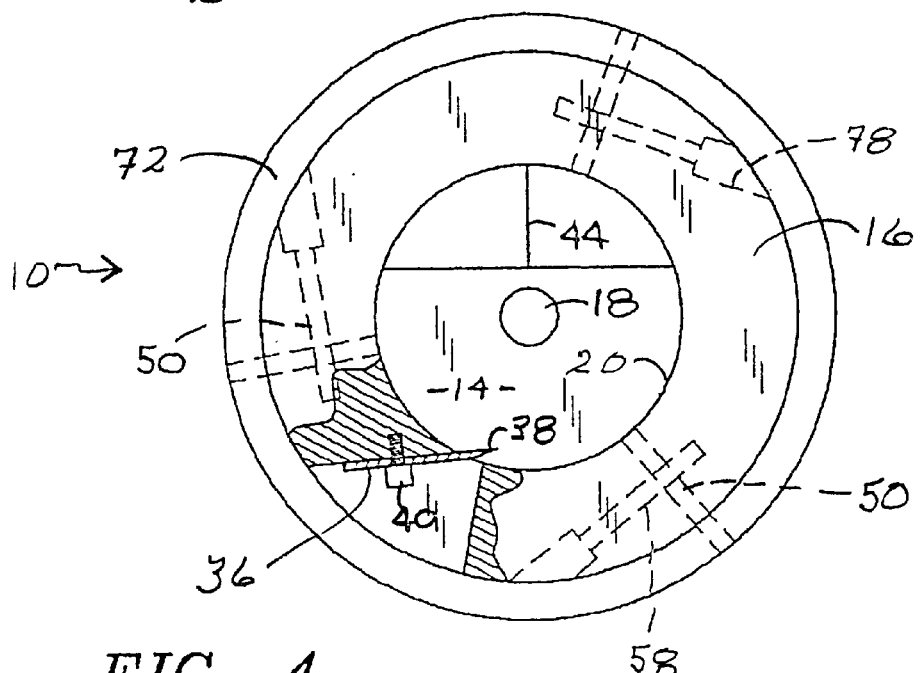
FIG. 4 is a is a bottom plan view, partially in section to show interior detail, of the stripper of FIG. 1.

Turning to the views of FIGS. 3 and 4, stripper 10 further comprises a first blade 36 mounted on housing 10 and including a first blade sharpened edge 38 disposed in communicating relation to passageway 20 such that sharpened edge 38 may engage and remove the external layer of insulation 24 as cable 22 is inserted into stripper 10 and stripper 10 is rotated. First blade 36 may be attached to a portion of housing 12 as by screw 40.

Returning to the perspective view of FIG. 5, stripper 10 further comprises a second blade 42 having a sharpened edge 44 mounted on housing 12 such that second blade sharpened edge 44 is disposed in operative communication with the distal end of cable 22 from which the outer insulation 24 has been stripped. Second blade 42 may be attached as by adjustable set screw 46. Thus, sharpened edge 44 is operatively mounted so that it may trim the distal ends of outer conductor 26, inner conductor 28, and insulation 30 disposed there between so as to provide a planer end of stripped cable 22 that is substantially normal to the longitudinal dimension of cable 22.

Figure 1:
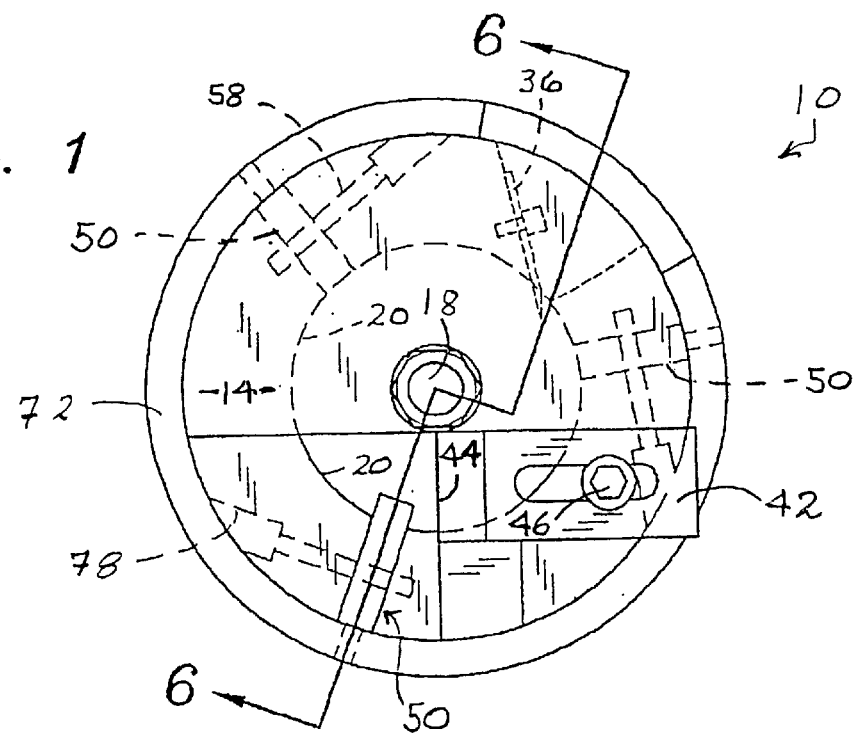
FIG. 1 is a top plan view of a preferred embodiment of the cable stripper with portions of the interior detail shown in broken lines.

With particular regard to the sectional views of FIGS. 6 and 7 and the top and bottom plan views of FIGS. 1 and 4, stripper 10 further comprises a plurality of cable stops, generally indicated as 48 in the views of FIGS. 1 and 4. While three cable stops 48 are shown in this preferred construction for stripper 10, it is to be understood that one or more will provide functionality. Each of the cable stops 48 comprise a stop member 50 having a top surface 52, a bottom surface 54, and a back surface 56. Each of the stop members 50 is pivotally attached to housing 12 as by pivot pin 58. Extending outwardly from stop member top surface 52 toward passageway 20 is a cable shoulder 60. Comparing the views of FIGS. 6 and 7, one can see that cable shoulder 60 extends into passageway 20 such that the distal end of stripped cable 22 engages cable shoulder 60 to pivot it outwardly. Extending outwardly from stop member bottom surface 54 is a lock tip 62. As clearly seen in the view of FIG. 7, the pivoting action of stop member 50 will cause each of the lock tips 62 to engage a corresponding groove 34 on the exposed surface of ridged outer conductor 26. This effectively locks cable 22 from further advancement, thereby preventing any further trimming of the stripped cable 22 by second blade 42 and its sharpened edge 44. It is also to be noted that each of the lock tips 62 are preferably formed from plastic material so that no damage or scarring is caused along the exposed surface of ridged outer conductor 26. In this preferred embodiment for stripper 10, lock tips 62 are formed from nylon.

Disposed below each of the stop members 50 is a retaining member 64 with each of the retaining members 64 having a bearing surface 66 disposed in abutting relation to corresponding bottom surface 54 of stop member 50. A biasing means 68 is operatively disposed between bottom end 16 of housing 12 and each of the retaining members 64 such that each of the bearing surfaces 66 normally abut a corresponding bottom surface 54 as best seen in the view FIG. 6. Referring to the view of FIG. 7, one can see that as the stop members 50 pivot, each of the bottom surfaces 54 move off bearing surface 66 onto angled surface 70 and are held in the position shown in the view of FIG. 7 by the action of biasing means 68. This effectively locks each of the lock tips 62 into a corresponding groove 34, as described above.

Figure 2:
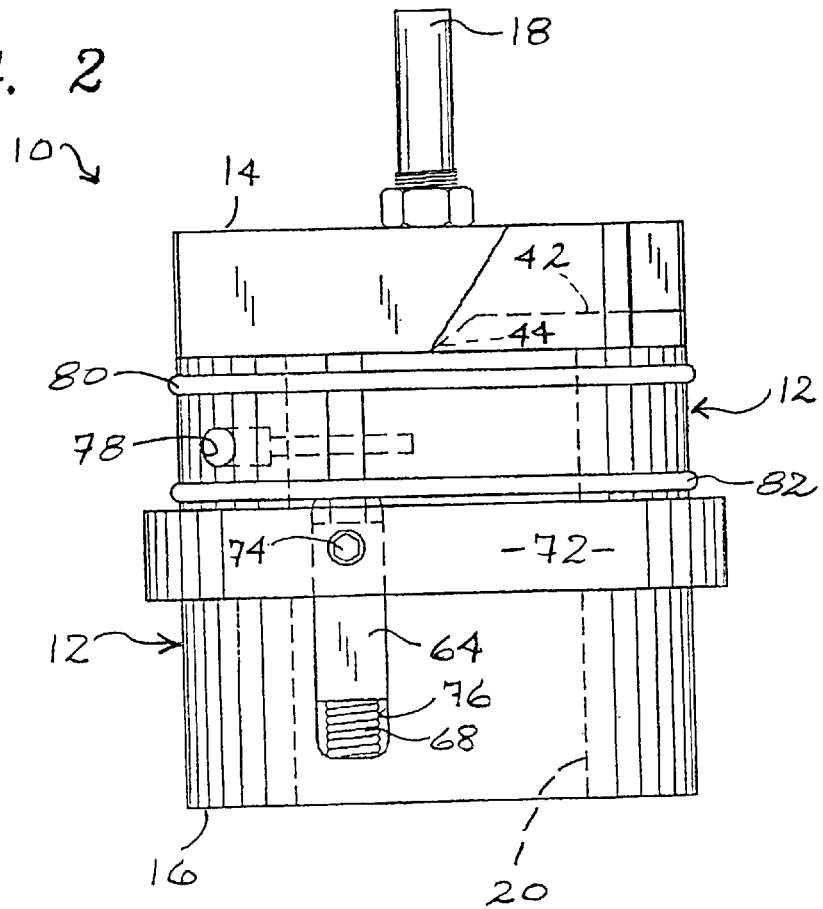
FIG. 2 is a front side elevation of the stripper shown in FIG. 1.

In order to release the stripped cable 22 from stripper 10, stripper 10 further comprises a reset ring 72. Reset ring 72 is moveably disposed around housing 12 and attached to each of the retaining members 64 by reset screws 74. As best seen in the views of FIGS. 2 and 3, portions of housing 12 are relieved to define reset slots 76 whereby the reset ring 72 may be pulled downwardly against the normal action of biasing means 68 to release each of the lock tips 62 from its corresponding groove 34 and reset each of the stop members 50 to the "rest" position illustrated in the view of FIG. 6. A plurality of stop member biasing means which, in this preferred embodiment comprise a top biasing band 80 and a bottom biasing band 82 assist in resetting stop members 50. Each of the top and bottom biasing bands 80 and 82, respectively, are preferably formed from an elastic material such as, for example, rubber O-rings. As shown in the view of FIG. 7, when stop member 50 pivots outwardly a portion of back surface 56 engages the biasing resistance provided by top biasing band 80. Thus, when reset ring 72 is pulled downwardly to reset stop members 50 to the "rest" position shown in FIG. 6, the action of top biasing band 80 ensures proper repositioning of each of the stop members 50. Bottom biasing band 82 serves to ensure proper "rest" positioning of the stop members 50.

Finally, it is to be noted that a plurality of pivot pin access ports 78 are provided through housing 12 for the removal of pivot pins 58, as necessary.

While the above detailed description has been given with regard to a preferred construction, it is, of course, to be understood that stripper 12 may be easily modified and adapted to permit use with a variety of cable sizes. Modification of the device by the replacement of stop members 50 and retaining members 64 of different sizes, along with a modification of the distance between sharpened edge 38 and sharpened edge 42 would permit stripping different lengths of external insulation 24 in accord with the requirements of the intended end use of cable 22. In all instances it is important to note that the exposed surface of ridged outer conductor 26 will not be damaged or marred and that cable 22 will be locked against further advancement into stripper 10, thereby virtually assuring that cable 22 is properly stripped to ensure its functionality in an operational installation.

It will thus be seen that the objects set forth above, among those made apparent from the preceding description, are efficiently attained, and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

Now that the invention has been described,

What is claimed is:

1. A cable stripper for removing the external layer of insulation from a coaxial cable having a ridged outer conductor and for trimming the stripped cable end, said cable stripper comprising: a housing comprising a top end and a bottom end and defining a central axis between said top and bottom ends, said top end further comprising a shaft attached thereto whereby said cable stripper may be turned; said housing comprising a passageway formed from said bottom end toward said top end along said central axis, said passageway being dimensioned and configured to receive the cable therein; a first blade mounted on said housing and comprising a first blade sharpened edge, said first blade sharpened edge being in operative communication with said passageway whereby said first sharpened edge may remove the external layer of insulation from the cable received in said passageway as said cable stripper is turned; a second blade mounted on said housing and comprising a second blade sharpened edge; said second blade sharpened edge being in operative communication with a distal end of the cable from which the insulation has been stripped whereby said second blade sharpened edge may trim the distal end of the cable to define a planar surface; and a plurality of cable stops operatively mounted on said housing in engaging relation to the cable whereby only a predetermined segment of the external layer of insulation may be removed, each one of said plurality of cable stops comprises a stop member having a top surface and a bottom surface, each one of said cable stops being pivotally attached to said housing, each one of said plurality of cable stops further comprising a retaining member having a bearing surface disposed in abutting relation to said stop member bottom surface, each of said retaining members comprising a biasing means whereby said bearing surface is normally urged into said abutting relation; and a reset ring movably mounted on said housing in operative engagement to each of said plurality of retaining members whereby the action of each of said biasing means may be overcome to move said bearing surfaces away from said stop member bottom surfaces.

2. A cable stripper as in claim 1 wherein each of said plurality of cable stops comprises a cable shoulder formed adjacent said top surface dimensioned and configured to be engaged by the stripped distal end of the cable when at least a portion of the outer insulation has been removed, causing each one of said plurality of cable stops to pivot such that said cable shoulders move away from the stripped distal end of the cable; each one of said plurality of cable stops further comprising a lock tip formed adjacent said bottom surface dimensioned and configured to engage a groove of the ridged outer conductor when said cable shoulders pivot away from the stripped distal end of the cable, and each one of said cable stops further comprising a back surface opposite said lock tip, whereby no further outer insulation layer may be removed from the coaxial cable when each one of said lock tips engages a corresponding one of the grooves, and said second blade sharpened edge may trim the stripped distal end.

3. A cable stripper as in claim 2 wherein each of said lock tips is formed of plastic.

4. A cable stripper as in claim 3 wherein said plastic is nylon.

5. A cable stripper as in claim 4 wherein each one of said retaining member bearing surfaces defines a first planar segment that abuts a corresponding one of said plurality of stop member bottom surfaces and a second angled surface that abuts said back surface of each one of said cable stops opposite said lock tip when said cable stops are pivoted by engagement of the stripped distal end of the cable, whereby each one of said lock tips is held in a corresponding cable groove.

6. A cable stripper as in claim 5 further comprising a plurality of stop member biasing means operatively mounted on the stripper in engaging relation to each one of said plurality of stop members such that at least one of said stop member biasing means is above said pivotal attachment and at least one other of said stop member biasing means is below said pivotal attachment, whereby each one of said first planar surfaces of said retaining members normally abuts a corresponding one of said stop member bottom surfaces.

* * * * *